United States Patent [19]

Otto

[11] 4,326,33:
[45] Apr. 27, 198:

[54] METHODS OF MANUFACTURING A PRIME MOVER AND A ROTATABLE ASSEMBLY THEREFORE

[75] Inventor: Charles W. Otto, DeKalb, Ill.

[73] Assignee: General Electric Company, Fort Wayne, Ind.

[21] Appl. No.: 92,608

[22] Filed: Nov. 8, 1979

Related U.S. Application Data

[62] Division of Ser. No. 889,963, Mar. 24, 1978, Pat. No. 4,215,287.

[51] Int. Cl.³ .............................................. H02K 15/02
[52] U.S. Cl. ....................................... 29/598; 29/525; 310/42; 310/90
[58] Field of Search ................ 29/596, 598, 597, 525; 310/42, 216, 217, 90, 261-269

[56] References Cited

U.S. PATENT DOCUMENTS

| | | | |
|---|---|---|---|
| 2,421,115 | 5/1947 | Carlson | 310/217 |
| 2,795,715 | 6/1957 | Gilchrist | 29/598 X |
| 3,149,860 | 9/1964 | Hallesy | 29/525 X |
| 3,204,134 | 8/1965 | Schneider | 310/4: |
| 3,271,604 | 9/1966 | Priddy | 29/598 ) |
| 3,470,604 | 10/1969 | Zenick | 29/525 ) |
| 3,619,882 | 11/1971 | Sobanski et al. | 29/159.: |
| 3,740,832 | 6/1973 | Toepper | 29/525 ) |
| 3,786,561 | 1/1974 | Busian | 29/59: |

Primary Examiner—Carl E. Hall
Attorney, Agent, or Firm—Joseph E. Papin

[57] ABSTRACT

A method of manufacturing a rotatable assembly adapted for use in a prime mover. The rotatable assembly includes a shaft having a peripheral surface along a least a part thereof and at least another componen having an opening therethrough. In this method, a plu rality of generally annular axially spaced apart ridges i deformed from the shaft, and the ridges are in par extended beyond the peripheral surface of the shaft The opening of the other component is arranged gener ally circumferentially about at least some of the ridge in displacement preventing engagement therewith.

A method of manufacturing a prime mover is also dis closed.

22 Claims, 13 Drawing Figures

METHODS OF MANUFACTURING A PRIME MOVER AND A ROTATABLE ASSEMBLY THEREFORE

CROSS-REFERENCE TO RELATED APPLICATION

This application is a division of application Ser. No. 889,963 filed Mar. 24, 1978, now U.S. Pat. No. 4,215,287 which is incorporated herein by reference.

FIELD OF THE INVENTION

This invention relates generally to electrical apparatus and in particular to a method of manufacturing a prime mover and a method of manufacturing a rotatable assembly for use in a prime mover.

BACKGROUND OF THE INVENTION

In the past, prime movers, such as dynamoelectric machines or electric motors for instance, were provided with a stationary assembly having a rotatable assembly disposed in magnetic coupling relation therewith. The rotatable assembly included a shaft having a pair of opposite end portions which were rotatably supported or otherwise suitably journaled in the stationary assembly. A rotor was mounted to the shaft, and a pair of thrust devices were disposed on the shaft with respect to the opposite end portions thereof for bearing engagement with a pair of confronting thrust surfaces provided therefor on the stationary assembly. Of course, the axial movement or end play of the rotatable assembly with respect to the stationary assembly was predetermined by the axial distance between the thrust devices on the shaft and their associated thrust surfaces on the stationary assembly, respectively.

In these past rotatable assemblies, the shaft thereof was mounted in displacement preventing engagement with the rotor by several well known manufacturing processes. One of these processes was to provide a conventional knurl, such as for instance a diamond knurl or axial knurl, at a preselected location on the shaft and then press-fit the bore of the rotor on such conventional knurl into displacement preventing engagement therewith. Another of these past manufacturing processes involved heating the core to effect its expansion and the expansion of the bore thereof, locating the expanded bore in the preselected location thereof about the shaft, and cooling the rotor to effect thermal shrinking of the rotor bore into displacement preventing engagement about the shaft. Of course, one of the disadvantageous or undesirable features of such past thermal shrinking process is believed to be that it was impossible to remove the rotor from the shaft without destroying the shaft and/or the rotor.

In the past, the thrust devices, such as thrust collars or the like for instance, were also mounted to the shaft generally in the same manner as discussed above with respect to rotors. For instance, an annular thrust collar was heated and thermally shrunk into displacement preventing engagement about the shaft at a preselected location thereon; however, at least one of the disadvantageous or undesirable features with respect to such thermal shrinkage is believed to be that it was impossible to remove the collar without destroying it and/or the shaft. Another analogous disadvantageous or undesirable feature is believed to be that the aforementioned heating of the thrust collar may have had a deleterious affect thereon, such as softening and/or distorting it. And yet another analogous disadvantageous or undesirable feature is believed to be that such heating of the thrust collar consumed energy which, at present, may be in short supply as illustrated by the energy conservation measures being promulgated by various concerned governmental agencies and utility companies.

Also in the past, thrust collars were pressed into displacement preventing engagement with the aforementioned conventional knurls about the shaft; however, at least one of the disadvantageous or undesirable features of this assembly scheme is believed to be that the press-fitting engagement of the thrust collar about the conventional knurls did not provide an oil tight seal between the thrust collar and the shaft when the thrust collar was also operating as a slinger or the like for lubricant employed in the prime mover.

Another one of the well past arrangements utilized in positioning a thrust collar on the shaft of the rotatable assembly involved machining an annular groove in the shaft and providing a split ring retainer in the groove for positioning engagement with the thrust collar. Resilient means, such as a retaining spring or the like, may also have been provided so as to maintain the thrust collar in its mounted position about the shaft. At least one disadvantageous or undesirable feature of this type of arrangement is believed to be that the location of the thrust collar on the shaft was indefinite and could not be infinitely varied due to the accumulation of tolerances, i.e. tolerance buildup, between the various parts, such as the groove, the split ring retainer, the spring and the thrust collar itself, which not only deleteriously affected to thrust collar location but also the end play tolerances of the rotatable assembly with respect to the stationary assembly. Another disadvantageous or undesirable feature of this thrust collar arrangement is believed to be that the provision of the groove in the shaft served to weaken the shaft.

SUMMARY OF THE INVENTION

Among the several objects of the present invention may be noted the provision of an improved rotatable assembly, and an improved method of manufacturing a rotatable assembly which overcome the aforementioned disadvantageous or undesirable feature, as well as others, of the prior art; the provision of such improved methods in which a unique association of thrust devices and/or a rotor of the rotatable assembly is provided with a shaft thereof; the provision of such improved methods in which a plurality of generally annular spaced apart ridges are deformed from the shaft so as to extend in part generally radially beyond the shaft without weakening the shaft; the provision of such improved methods in which the thrust devices and/or rotor is disposed about the shaft in displacement preventing engagement with at least some of the ridges of the plurality thereof; the provision of such improved methods wherein the engagement of the thrust devices about the ridge plurality defines a plurality of seals for preventing the passage of lubricant between the thrust devices and the shaft; the provision of such methods in which at least one of the ridges of the plurality thereof is predeterminately located with respect to the axial extent of the shaft and extends generally radially outwardly of the shaft farther than the other ridges of the plurality thereof so as to provide a means for predeterminately locating the thrust device with respect to the axial extent of the shaft; the provision of such methods in which the locating means for the thrust devices may be utilized to very accurately predetermine and hold a desired end play tolerance between the rotatable assembly and a stationary assembly of such prime mover; and the provision of such improved methods in which the components thereof are simplified in design, economically manufactured and easily assembled. These as well as other objects and advantageous features of the present invention will be in part apparent and in part pointed out hereinafter.

In general, a method in one form of the invention is provided for manufacturing a rotatable assembly having a shaft and adapted for use in a prime mover. In this method, a plurality of generally annular, axially spaced apart ridges are deformed from the shaft and extend in part generally radially outwardly beyond the shaft. The shaft and a thrust device may be moved with respect to each other so as to position an opening in the thrust device about the shaft in displacement preventing engagement with at least some of the ridges of the plurality thereof. Further, in one form of the invention and with respect to this method, at least one of the ridges of the plurality thereof may extend generally radially outwardly of the shaft farther than the others of the ridges of the plurality thereof so as to engage and locate the thrust device on the shaft axially thereof.

Also in general, a method in one form of the invention is provided for manufacturing a prime mover having a stationary assembly with a pair of axially spaced apart opposed thrust surfaces and a rotatable assembly. The rotatable assembly includes a shaft with a pair of opposite end portions, a peripheral surface on the shaft between the opposite end portions, and a pair of thrust devices. In this method, a plurality of generally annular axially spaced apart ridges are deformed from the peripheral surface of the shaft with the ridges extending in part generally radially beyond the peripheral surface. The thrust devices are associated about the shaft in displacement preventing engagement with at least some of the ridges, and the thrust devices are located in spaced apart relation on the shaft with respect to the opposite end portions thereof, respectively. The opposite end portions of the shaft are assembled in rotatable supporting engagement with the stationary assembly so that the rotatable assembly is disposed for magnetic coupling relation therewith, and the thrust devices are arranged at least closely adjacent the opposed thrust surfaces of the stationary assembly.

BRIEF DESCRIPTION OF THE DRAWINGS

Corresponding reference characters refer to corresponding parts throughout the several views of the drawings.

The exemplifications set out herein illustrate the preferred embodiments of the invention in one form thereof, and such exemplifications are not to be construed as limiting the scope of the disclosure or the scope of the invention in any manner.

DETAILED DESCRIPTION OF THE PREFERRED EMBODIMENTS

Figure 1:
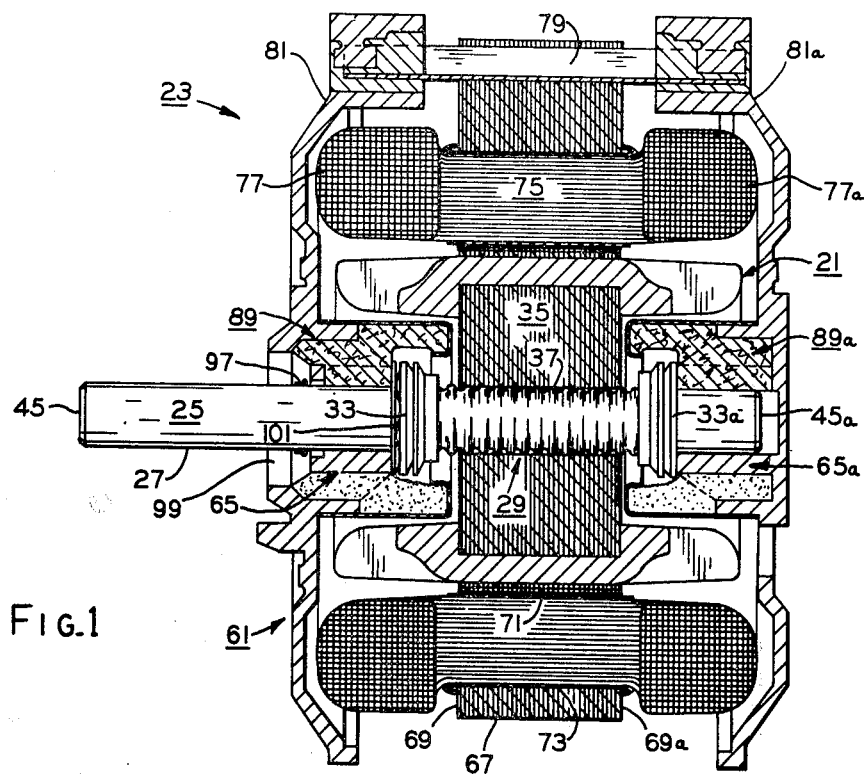
FIG. 1 is a partial sectional view showing a prime mover and a rotatable assembly thereof, respectively.

Referring now to the drawings in general, there is illustrated in one form of the invention a method of manufacturing a rotatable assembly 21 adapted for use in a prime mover, such as a dynamoelectric machine or an electric motor 23 for instance, and the rotatable assembly includes a generally elongate, cylindric shaft 25 having a peripheral surface or section 27 thereon (FIG. 1). In this method, a plurality of generally annular, axially spaced apart ridges 29 are integrally formed with or deformed from peripheral surface 27 of shaft 25, and ridges 31 of plurality 29 thereof are extended in part generally radially beyond the peripheral surface (FIG. 4). Another component of rotatable assembly 21 or a generally annular thrust device 33, such as a thrust collar or the like for instance, is assembled about shaft 25 into gripping or displacement preventing engagement with at least some of ridges 31 (FIG. 3). Further in general and also in one form of the invention, rotatable assembly 21 maybe provided with yet another component or a generally annular ferromagnetic rotor 35 having a generally axial bore 37 therethrough, and the rotor bore may be assembled about shaft 25 into gripping or displacement preventing engagement with at least some of ridges 31 (FIGS. 1-3).

More particularly and with specific reference to FIG. 4, forming or deforming tooling, such as a set of rollers or rolling tools shown at 39 for instance, may be employed to impart the desired configuration of ridge plurality 29 to shaft 25. However, while tooling 39 is shown for purposes of illustration, it is contemplated that other tooling, such as various dies or die sets for instance, may be utilized to impart the desired configurations to shaft 25 within the scope of the invention so as to meet the objects thereof. Furthermore, since it is contemplated that equipment well known to the art may be employed with tooling 39 and shaft 25 so as to impart thereto the desired configurations of ridge plurality 29, the description and operation of such equipment is omitted for the sake of brevity of disclosure. In imparting the desired configuration of ridge plurality 29 to shaft 25, tooling 39 is moved in the direction of the arrows in FIG. 4 into forming or deforming engagement with peripheral surface 27 of the shaft while the shaft is being rotated. In response to the force of such deforming engagement between tooling 39 and shaft 25, the metal of the shaft is deformed or otherwise moved, i.e. by cold working for instance, with respect to peripheral surface 27 of the shaft generally into conformance with the preselected configuration provided on the tooling and such metal movement thereby forms the desired configuration, i.e. ridge plurality 29 in the peripheral surface of the shaft. Since the metal of shaft 25 is only moved or rearranged, i.e. not removed from the shaft, it is preferred that the shaft is not generally weakened when ridge plurality 29 is integrally formed in peripheral surface 27 of the shaft, but of course, some such weakening may occur. Upon the aforementioned formation of ridge plurality 29, it may be noted that each ridge 31 of the plurality thereof is predeterminately shaped so as to be generally annular and axially spaced apart from each other along the shaft, and the ridges have an outer periphery, such as peripheral portion or surface 41, which is disposed or extends predeterminately generally radially outwardly or beyond peripheral surface 27 of shaft 25. The annular and axially spaced arrangement of ridges 31 and also the extension thereof beyond peripheral surface 27 of shaft 25 is an important aspect of the invention and will be discussed in greater detail hereinafter. While the particular groupings of ridges 31 and also the shapes thereof are illustrated herein for purposes of disclosure, it is contemplated that other ridges having various other shapes and arranged in various other groupings, including but not limited to those disclosed in FIGS. 5, 7, 8 and 12 for instance, may be utilized within the scope of the invention in one form thereof so as to meet at least some of the objects and advantageous features of such invention.

Figure 2:
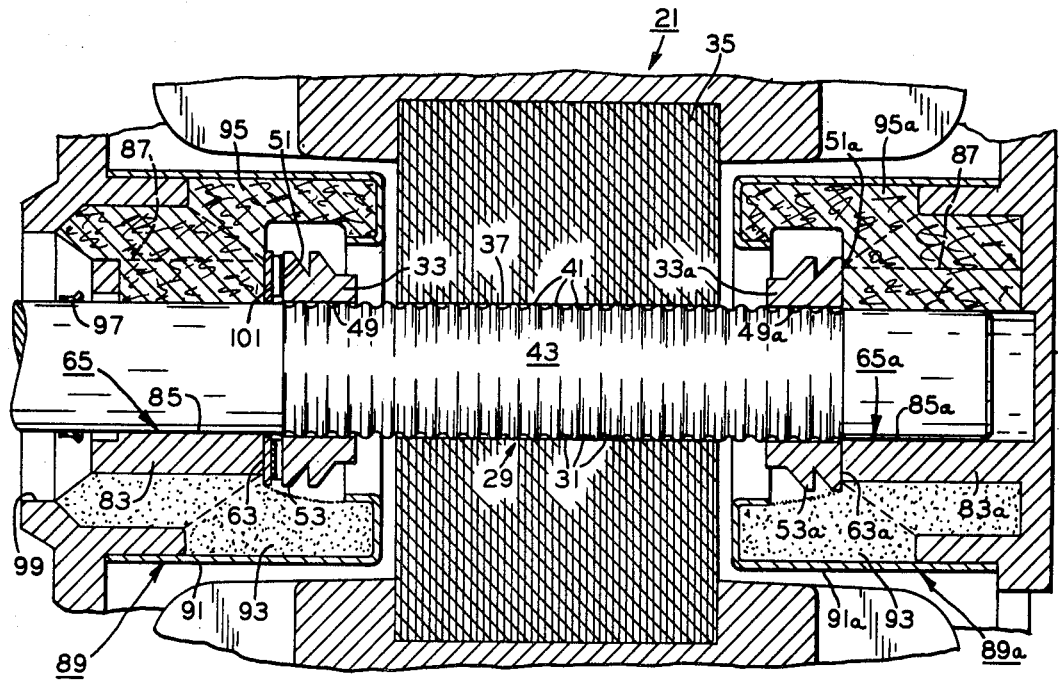
FIG. 2 is a greatly enlarged partial sectional view taken from FIG. 1.
Figure 3:
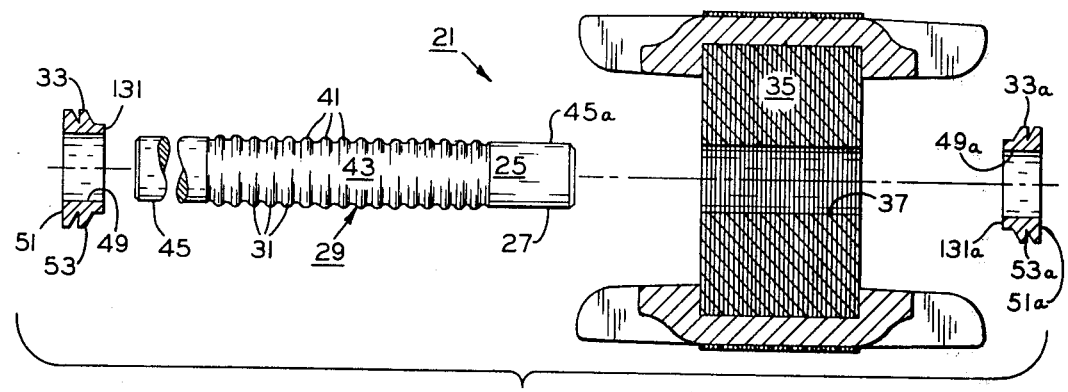
FIG. 3 is an exploded isometric view of the rotatable assembly of FIG. 1 illustrating principles which may be utilized in a method of manufacturing a prime mover and a method of manufacturing a rotatable assembly in one form of the invention, respectively.
Figure 4:
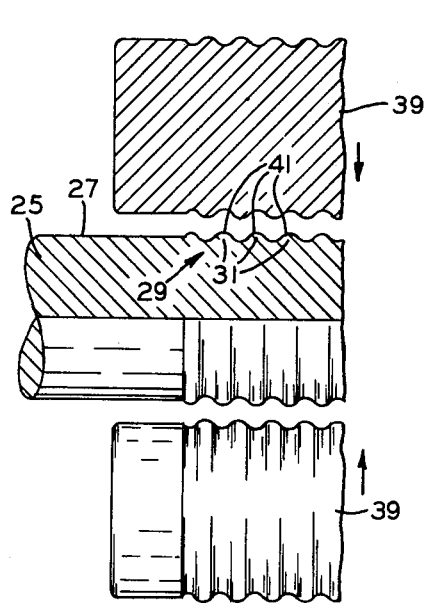
FIG. 4 is a partial sectional view of a forming tool associated with the shaft of the rotatable assembly of FIG. 1 also illustrating the methods of manufacturing.
Figure 5:
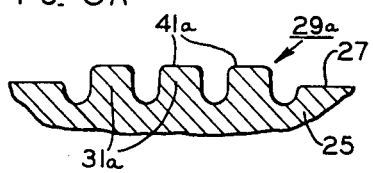
FIG. 5 is a partial sectional view of the shaft of the rotatable assembly of FIG. 1 illustrating a ridge plurality having an alternative cross-sectional configuration.

Referring now to FIGS. 1–3, it may be noted that a preselected span or axial length 43 of ridge plurality 29 is provided along shaft 25 in peripheral surface 27 thereof with the ridge plurality being formed in the peripheral surface in the same manner discussed hereinbefore, and such preselected span of the ridge plurality may be conveniently and accurately located or referenced on the shaft with respect to a pair of opposite ends or end portions 45, 45a thereof between which the peripheral surface is disposed. However, it is contemplated that ridges 31 of plurality 29 thereof may also be conveniently located with respect to other shaft features, such as for instance a groove or shoulder (not shown) which may be provided in the shaft, within the scope of the invention so as to meet the objects thereof. Subsequent to heating rotor 35 to effect expansion of bore 37 thereof, at least one of shaft 25 and the rotor may be moved with respect to the other thereof in order to dispose or otherwise locate or position the rotor bore about the shaft in a preselected location with respect to opposite end portions 45, 45a of the shaft. When so located, rotor 35 is allowed to cool thereby to effect the contraction or heat shrinking of rotor bore 37 into gripping or displacement preventing engagement with a grouping or at least some of ridges 31 in span 43 of ridge plurality 29. Of course, rotor bore 35 and outer peripheral portions 41 of ridges 31 on shaft 25 are predeterminately sized with respect to each other so as to accommodate the heat shrinking of the rotor bore onto or about the ridges, as discussed above. Although rotor 35 is described above as being mounted by heat shrinking onto shaft 25 for purposes of disclosure, it is, of course, contemplated that the rotor may be pressed or press-fitted onto ridge plurality 29 of the shaft within the scope of the invention so as to meet the objects thereof.

Thrust device 33 and another thrust device 33a, which may be of similar construction and material, such as a ferrous material or the like for instance, are respectively provided with a pair of generally axial bores or openings 49, 49a therethrough, and it may be noted that such openings and outer peripheral portions 41 of ridges 31 on shaft 25 are predeterminately sized with respect to each other so as to accommodate a press-fitting engagement therebetween, as discussed hereinafter. A pair of generally annular and planar thrust bearings or bearing surfaces 51, 51a are provided on thrust devices 33, 33a so as to extend generally radially with respect to openings 49, 49a therethrough, and a plurality of generally annular lubricant or oil slinging lands and grooves 53, 53a are provided about the periphery of the thrust devices adjacent the thrust bearings thereof, respectively. Thrust devices 33, 33a are mounted on shaft 25 in opposite relation with each other, i.e. with thrust bearings 51, 51a facing opposite each other, and to effect such mounting, at least one of the shaft and the thrust devices may be moved with respect to each other thereby to pass openings 49, 49a over or about opposite end portions 45, 45a of the shaft. Thereafter, thrust devices 33, 33a are press-fitted in response to axial forces applied thereto (not shown) or otherwise disposed about a pair of groupings of ridges 31 adjacent the opposite ends of span 43 of such ridges on shaft 25 so that openings 49, 49a of the thrust devices are arranged in gripping or displacement preventing engagement with outer peripheral portions 41 of at least some of the ridges in the grouping pair thereof. During this press fitting of thrust devices 33, 33a onto shaft 25, the thrust devices are moved generally axially of the shaft into preselected or predetermined locations or positions. In these predetermined positions, the opposed thrust bearings 51, 51a are predeterminately axially spaced apart and extend generally radially of shaft 25, and the predetermined positions of the thrust devices may be conveniently determined by locating or referencing the thrust bearings with respect to opposite end portions 45, 45a of shaft 25, respectively, or other shaft features (not shown), as previously mentioned. While thrust devices 33, 33a are described hereinabove as being mounted to shaft 25 generally simultaneously, it is contemplated that the thrust devices may be so mounted one before the other within the scope of the invention so as to meet the objects thereof. Furthermore, it is also contemplated that other thrust devices having other shapes or configurations and formed of material different than that discussed hereinabove with respect to thrust devices 33, 33a may be utilized within the scope of the invention so as to meet the objects thereof. When openings 49, 49a of thrust devices 33, 33a are disposed in the gripping engagement thereof about outer peripheral portions 41 of at least some of ridges 31, as previously mentioned, it may be noted that the generally annular or surface-to-surface engagements between the thrust device openings and the outer peripheral portions of the ridges respectively define a plurality of axially spaced means or positive seals therebetween for preventing the passage of lubricant between the thrust devices and shaft 25 which, as discussed in greater detail hereinafter, is an important aspect of the invention.

Figure 3A:
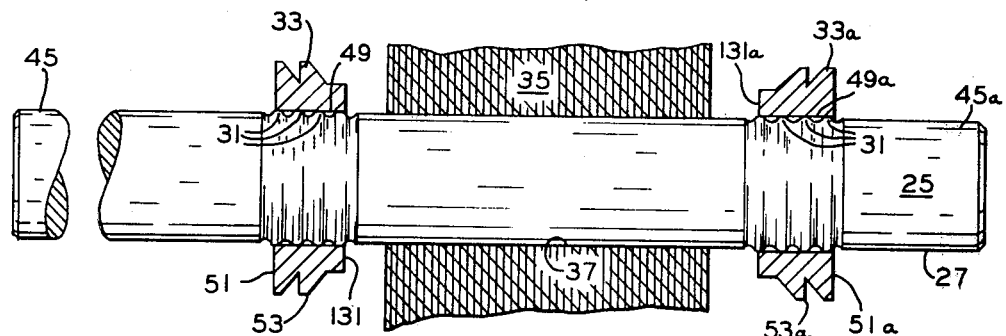
FIG. 3A is a partial sectional view of an alternative rotatable assembly adapted for use in the prime mover of FIG. 1.

While ridges 31 of plurality 29 thereof are illustrated and described hereinabove as being continuously or successively formed in span 43 along shaft 25, it is contemplated that the ridges may be arranged in selected spaced apart groupings or pluralities thereof with an undeformed portion of shaft peripheral surface 27 disposed or extending axially between such selected spaced apart ridge groupings, as shown in FIG. 3A for instance, in one form of the invention so as to meet the objects thereof. Of course, thrust devices 33, 33a may be mounted about the aforementioned spaced apart groupings of ridges 31, and rotor 35 may be mounted therebetween about shaft 25 in the same manner as previously discussed. Albeit it is not shown, it is also contemplated that a conventional knurl, such as a diamond knurl or an axial knurl, may be provided in peripheral surface 27 of shaft 25 and spaced between the aforementioned spaced apart groupings of ridges 31 for mounting rotor 35 within the scope of the invention in one form thereof so as to meet the objects of the invention.

Referring again in general to the drawings and recapitulating at least in part with respect to the foregoing, rotatable assembly 21 is adapted for use in prime mover 23 (FIG. 1), and shaft 25 of the rotatable assembly has peripheral surface 27 interposed between opposite end portions 45, 45a thereof (FIG. 3). Ridge plurality 29 is integral with shaft 25 with ridges 31 of the plurality thereof extending in part generally radially beyond peripheral surface 27 of the shaft (FIGS. 2, 3, 3A and 4). Thrust devices 33, 33a are disposed about shaft 25 in gripping or displacement preventing engagement with at least some of ridges 31 and in predetermined spaced relation with respect to end portions 45, 45a of the shaft (FIGS. 1, 2 and 3A).

Further, there is also illustrated, in one form of the invention a method of manufacturing prime mover 23 having a stationary assembly, indicated generally at 61, with a pair of opposed thrust or thrust-taking surfaces 63, 63a predeterminately axially spaced apart thereon (FIG. 1). Rotatable assembly 21 of prime mover 23 includes shaft 25 having opposite end portions 45, 45a with peripheral surface 27 therebetween and thrust devices 33, 33a (FIGS. 1-3 and 3A). In this method, ridge plurality 29 is deformed from shaft 25 with ridges 31 of the plurality thereof extending in part generally radially beyond peripheral surface 27 of shaft 25 (FIG. 4). Thrust devices 33, 33a are associated with shaft 25 in displacement preventing engagement about some of ridges 31, and the thrust devices are located in spaced axial relation on the shaft with respect to opposite end portions 45, 45a thereof, respectively (FIGS. 2 and 3A). Opposite end portions 45, 45a, of shaft 25 are assembled in rotatable supported or journaled engagement with stationary assembly 61, and thrust devices 33, 33a are arranged with respect to thrust surfaces 63, 63a for respective thrust engagement therewith to predeterminately limit end play or axial movement of rotatable assembly 21 with respect to the stationary assembly (FIGS. 1 and 2).

More particularly and with specific reference to FIG. 1, upon the assembly or disposition of rotatable assembly 21 with stationary assembly 61, opposite end portions 45, 45a of shaft 25 are rotatably supported or otherwise suitably journaled in a pair of axially spaced apart and opposed bearing assemblies 65, 65a respectively provided on the stationary assembly. Thrust taking surfaces 63, 63a are illustrated as generally flat, annular surfaces which may be defined in their aforementioned predetermined axially spaced apart relation on bearing assemblies 65, 65a; therefore, with shaft end portions 45, 45a so rotatably supported in bearing assemblies 65, 65a, it may be noted that thrust bearings 51, 51a of thrust devices 33, 33a are arranged generally axially and at least closely adjacent the thrust-taking surfaces for thrust engagement therewith upon energization of prime mover 23, as discussed hereinafter. Thus, the axial spaced relation between thrust bearings 51, 51a of thrust devices 33, 33a on shaft 25 and thrust-taking surfaces 63, 63a on stationary assembly 61 defines the amount of end-play or axial movement between rotatable assembly 21 and stationary assembly 61, and since the axial spacing between the thrust bearings of the thrust devices and also between the thrust-taking surfaces of the stationary assembly may be very accurately predetermined, it may be noted that such amount of end-play between the rotatable assembly and the stationary assembly may be closely predetermined and held to a desired minimum.

With reference again in general to the drawings and again recapitulating at least in part with respect to the foregoing, prime mover 23 is illustrated as having stationary assembly 61 with thrust taking-surfaces 63, 63a thereon, and rotatable assembly 21 is adapted for magnetic coupling relation with the stationary assembly (FIG. 1). Rotatable assembly 21 includes shaft 25 having opposite end portions 45, 45a rotatably supported in stationary assembly 61, and the shaft has peripheral surface 27 disposed between the opposite end portions thereof (FIGS. 1-3 and 3A). Ridge plurality 29 is integral with shaft 25 and extends in part generally radially beyond peripheral surface 27 of the shaft (FIG. 4). Thrust devices 33, 33a are disposed about shaft 25 in displacement preventing engagement with at least some of ridges 31 of plurality 29 thereof, and the thrust devices are predeterminately located on the shaft and with respect thrust-taking surfaces 63, 63a for the thrust engagement or association therewith (FIGS. 1 and 2).

More particularly and with specific reference to FIG. 1, stationary assembly 61 is provided with a ferromagnetic stator 67 having a pair of opposite ends or end faces 69, 69a which are respectively intersected by a bore 71 extending generally axially through the stator. A plurality of generally radially disposed winding means accommodating slots 73 are also provided in stator 67 respectively intersecting with both bore 71 thereof and stator end faces 69, 69a. Winding means 75, such as a plurality of conductor turns or coils thereof, is disposed in slot plurality 73 having suitable insulation interposed therebetween, and the winding means has a pair of opposite generally annular goupings of end turns 77, 77a thereof disposed adjacent stator end faces 69, 69a, respectively. A plurality of beams or the like, such as that shown at 79 for instance, are associated or otherwise fixedly secured to stator 67 generally adjacent its outer peripheral portion, and the opposite ends of the beams are fixedly secured by suitable means to a pair of structural components, such as opposite end plates 81, 81a or the like for instance, of stationary assembly 61. If a more detailed discussion of the securement of beams 79 to stator 67 and of beams 79 to end plates 81, 81a is desired, reference may be had to U.S. Pat. No. 3,858,067 issued Dec. 31, 1974 to Charles W. Otto and to U.S. Pat. No. 3,867,654 issued Feb. 18, 1974 to Charles W. Otto, and each of these patents is specifically incorporated by reference herein. Although stationary assembly 61 is illustrated herein as having a particular construction, it is contemplated that other stationary assemblies having various other constructions may be utilized in prime mover 23 within the scope of the invention so as to meet the objects thereof.

Bearing assemblies 65, 65a are illustrated as being integral with end plates 81, 81a and having a pair of generally annular hubs 83, 83a or the like extending from the end plates generally axially toward opposite end faces 69, 69a of stator 67, respectively. A pair of generally cylindric bearing means 85, 85a or the like are generally axially provided in hubs 83, 83a of bearing assemblies 65, 65a, and thrust-taking surfaces 63, 63a are defined on the generally annular free ends of the hubs so as to be arranged generally perpendicular to the axis of the bearing means. Wick receiving slots or windows 87, 87a are generally radially provided through hubs 83, 83a, and the windows intersect or otherwise communicate with both bearing means 85, 85a and thrust-taking surfaces 63, 63a. Of course, bearing means 85, 85a rotatably support or otherwise suitably journal opposite end portions 45, 45a of shaft 25 upon the assembly of rotatable assembly 21 with stationary assembly 61, and with shaft end portions so suitably arranged with the bearing means, thrust bearings 51, 51a of thrust devices 33, 33a on the shaft are associated in the end-play determining or or defining relation with thrust-taking surfaces 63, 63a on hubs 83, 83a, respectively, as previously discussed. Furthermore, when opposite end portions 45, 45a of shaft 25 are so received in bearing means 85, 85a, rotor 35 is disposed at least in part within bore 71 of stator 67 so that rotatable assembly 21 is arranged in the aforementioned magnetic coupling relation with stationary assembly 61.

A pair of lubrication systems 89, 89a or the like are also integrally arranged with end plates 81, 81a in association with bearing assemblies 65, 65a thereof. Lubrication systems 89, 89a have a pair of containers, such as sleeves or open-ended cup-shaped members 91, 91a, secured to end plates 81, 81a by suitable means and extending generally coaxially with respect to hubs 83, 83a and thereabout. Means, such as a lubricant storage wick or storage wicking material 93, for containing a lubricant, such as oil for instance, and releasing it at a rate effective to provide adequate or desired lubrication in prime mover 23 may be manually packed or automatically injected, as well known in the art, into position between sleeves 91, 91a hubs 83, 83a of bearing assemblies 65, 65a. Lubricant storage wicking material or lubricant containing and releasing means 93 may be "G.E. Lube" manufactured by General Electric Company, Fort Wayne, Ind.; however, it is contemplated that other lubricant storage wicking materials may be employed in prime mover 23 within the scope of the invention so as to meet the objects thereof. A pair of feeder wicks 95, 95a of any suitable composition or material may be located within windows 87, 87a of hubs 83, 83a for lubricant feeding or transfer relation between storage wicking material 93 and opposite end portions 45, 45a of shaft 25 in bearing means 85, 85a. Feeder wicks 95, 95a also have parts thereof positioned for lubricating engagement with thrust bearings 51, 51a of thrust devices 33, 33a adjacent thrust-taking surfaces 63, 63a on hubs 83, 83a. If a more detailed discussion of the composition of lubricant storage wicking material 93 and the use thereof with feeder wicks 95, 95a in lubricating systems 89, 89a, reference may be had to U.S. Pat. No. 3,894,956 issued July 15, 1975 to James A. Whitt which is specifically incorporated by reference herein.

As may be noted, thrust devices 33, 33a are also employed in prime mover 23 so as to also serve as lubricant or oil slingers or throwers; therefore, lubricant storage wicking material 93 is disposed in a predetermined configuration (as best seen in FIG. 2) within sleeves 91, 91a of lubricant systems 89, 89a so as to extend generally coaxially with the thrust device in radially spaced relation about oil slinging lands and grooves 53, 53a of the thrust devices in order to capture any lubricant thrown therefrom, as discussed in greater detail hereinafter. To complete the description of prime mover 23, another lubricant slinger or thrower 97 may be disposed about shaft 25 between bearing means 85 and an opening 99 in end plate 81 through which end portion 45 of shaft 25 extends exteriorly of the prime mover. If a more detailed description or discussion of end plates 81, 81a as well as bearing assemblies 65, 65a and lubrication systems thereof is desired, reference may be had to the Charles W. Otto copending application Ser. No. 889,962 filed Mar. 24, 1978 which is specifically incorporated by reference herein. While bearing assemblies 65, 65a and lubrication systems 89, 89a are illustrated and described herein for purposes of disclosure, it is contemplated that other bearing assemblies and other lubrication systems may be utilized within the scope of the invention so as to meet the objects thereof.

In the operation of prime mover 23 upon the energization thereof and with reference to FIGS. 1 and 2, winding means 75 thereof is excited, and since rotatable assembly 21 is disposed in magnetic coupling relation with stationary assembly 61, such energization of the prime mover effects generally conjoint rotation of rotor 35 and shaft 25. Thus, rotation of opposite end portions 45, 45a of shaft 25 in bearing means 85, 85a of bearing assemblies 65, 65a effects a flow of lubricant from storage wicking material 93 in lubrication systems 89, 89a through feeder wicks 95, 95a into lubricant transfer relation with the rotating opposite end portions of the shaft thereof to provide a desired film of lubricant between the shaft opposite end portions and the bearing means journaling them, respectively. At least a part of the lubricant so transferred to shaft opposite end portions 45, 45a flow generally therealong without bearing means 85, 85a toward thrust devices 33, 33a However, in order to prevent lubricant loss or displacement of lubricant from lubrication systems 89, 89a, thrust devices 33, 33a interrupt these flows of lubricant along shaft 25, and in response to the conjoint rotation of the thrust devices with the shaft, the interrupted lubricant moves generally radially outwardly on thrust bearings 51, 51a, of the thrust devices toward the lands and grooves 53, 53a thereof which are effective to throw or otherwise cause the displacement of such interrupted lubricant from the thrust devices generally radially outwardly thereof toward a part of lubricant storage wicking material 93 disposed coaxially about the thrust devices. In this manner, the interrupted lubricant thrown by thrust devices 33, 33a generally radially outwardly thereof is captured by lubricant storage wicking material 93 so as to be recirculated or redistributed thereby in lubrication systems 89, 89a. It should be noted, however, that the aforementioned plurality of positive seals effected by the respective engagements of outer peripheries 41 of ridges 31 on shaft 25 with confronting parts of openings 49, 49a in thrust devices 33, 33a act to obviate the passage of lubricant through the openings between the thrust devices and the shaft. Therefore, ridges 31 of plurality 29 thereof not only provide seats on opposite ends 45, 45a about which thrust devices 33, 33a are engaged in very accurately located positions but also define with openings 49, 49a of the thrust devices the aforementioned series or plurality of positive seals which act to preserve the lubricant integrity of lubrication systems 89, 89a and to prevent the flow of lubricant between shaft 25 and the thrust devices into deleterious engagement with other components of prime mover 23.

In the event of end-play movement of rotatable assembly 21 with respect to stationary assembly 61 upon the energization of prime mover 23, thrust bearings 51, 51a of thrust devices 33, 33a are, of course, moved into rotating abutting or running engagement with thrust-taking surfaces 63, 63a on hubs 83, 83a of end plate 81, 81a. Since thrust bearings 51, 51a are accurately located on shaft 25 with respect to each other and also with respect to thrust taking surfaces 63, 63a, the end-play in prime mover may be maintained to a desired minimum amount, as previously mentioned. Further, since windows 87, 87a in hubs 83, 83a intersect thrust-taking surfaces 63, 63a thereon, feeder wicks 95, 95a located in the windows are effective to also transfer lubricant from storage wicking material 93 to thrust bearings 51, 51a of thrust device 33, 33a in the event of the aforementioned running engagement thereof with thrust-taking surfaces 63, 63a. Thus, in the arrangement of feeder wicks 95, 95a in lubrication systems 89, 89a, the thrust or end play limiting system or arrangement of prime mover 23 is also positively lubricated. Of course, any lubricant so transferred from feeder wicks 95, 95a directly onto thrust bearings 51, 51a of thrust devices 33, 33a may be thrown therefrom back into storage wicking material 93 so as to be captured thereby for recirculation in lubrication systems 89, 89a, as previously mentioned. While thrust bearings 51, 51a of thrust devices 33, 33a have been described as being associated in direct or face-to-face thrust engagement with thrust taking surfaces 63, 63a of stationary assembly, it is understood and contemplated that a running thrust washer assembly 101, such as a generally flat washer and a wavy spring washer for instance, may be disposed about shaft 25 for running engagement between thrust bearing 51 and thrust taking surface 63 within the scope of the invention in one form thereof so as to meet the objects of such invention.

Figure 7:
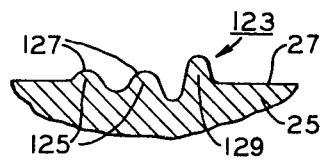
FIG. 7 is a greatly enlarged sectional view taken from FIG. 6 and illustrating a ridge plurality with one of the ridges extending radially beyond the others thereof so as to locate the thrust device axially along the shaft.
Figure 8:
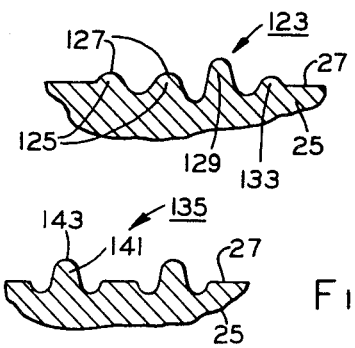
FIG. 8 is a sectional view showing an alternative ridge plurality to effect the location of the thrust device.
Figure 6:
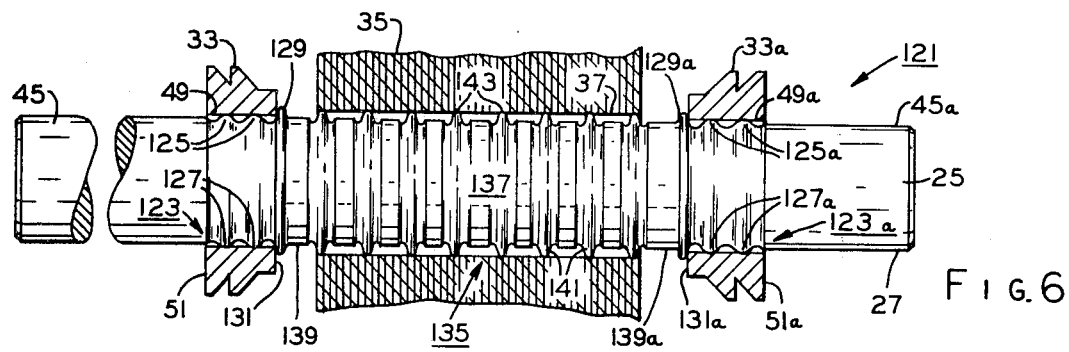
FIG. 6 is a partial sectional view of an alternative rotatable assembly in one form of the invention.

Referring now to FIGS. 6–8, there is illustrated another or an alternative rotatable assembly 121 for use on prime mover 23 having generally the same component parts and functioning generally in the same manner in the prime mover as the previously described rotatable assembly 21 with the exceptions set out hereinafter.

In rotatable assembly 121, a pair of generally opposite pluralities of ridges 123, 123a are grouped in preselected or predetermined axially spaced apart locations or positions on shaft 25, and such locations may be conveniently and accurately predetermined with respect to opposite ends 45, 45a of the shaft. These ridge pluralities 123, 123a may be formed, deformed of otherwise provided in shaft 25 in the same manner as previously described with respect to ridge plurality 29 (as best seen in FIG. 4 for instance). Thus, since metal is merely rearranged and not removed from shaft 25 when ridge pluralities 123, 123a are integrally formed in peripheral surface 27 of the shaft, the shaft is preferably, of course, not generally weakened, as previously mentioned. It may be noted that each ridge 125, 125a of ridge pluralities 123, 123a are predeterminately shaped so as to be generally annular and axially spaced apart from each other along shaft 25 so as to extend in part radially outwardly or beyond peripheral surface 27 of shaft 25, and ridges 125, 125a respectively have an outer periphery or peripheral portion 127, 127a which is disposed or extends generally radially outwardly or beyond peripheral surface 27 of shaft 25. Furthermore, it may also be noted that one ridge 129, 129a of ridge plurality 123, 123a is predeterminately extended radially outwardly or beyond peripheral surface 27 of shaft 25 farther than the other of the ridges in the ridge pluralities. Thus, ridges 129, 129a respectively define abutment means or means for seating or positively locating thrust devices 33, 33a on shaft 25. In other words, when ridge pluralities 123, 123a are formed in peripheral surface 27 of shaft 25, as previously discussed, abutment or locating ridges 129, 129a are each predeterminately located or referenced on the shaft with respect to shaft opposite ends 45, 45a or to other shaft features (not shown) provided therefor. Thereafter, when thrust devices 33, 33a are pressed onto shaft 25 so that openings 49, 49a of the thrust devices are press-fitted or otherwise disposed in gripping engagement about at least some of ridges 125, 125a of ridge pluralities 123, 123a, confronting parts or abutments, such as generally annular sidewalls 131, 131a for instance, provided on thrust devices 33, 33a generally opposite thrust bearings 51, 51a thereof, are moved into or otherwise arranged in locating or abutting engagement with abutment ridges 129, 129a on shaft 25. In this manner, when thrust devices 33, 33a are so located in abutment with abutment ridges 129, 129a, the thrust devices are positively located on shaft 25 with respect to opposite end portions 45, 45a, and thrust bearings 51, 51a of the thrust devices are accurately and predeterminately axially spaced apart on the shaft in positions adapted for thrust engagement with thrust-taking surfaces 63, 63a of stationary assembly 61 when rotatable assembly 121 is associated or assembled therewith in prime mover 23 in the same manner as previously discussed with respect to rotatable assembly 21. It may also be noted that the engagement of thrust device openings 49, 49a with peripheral portions 127, 127a of ridges 125, 125a in plurality 123, 123a thereof defines the aforementioned plurality of seals for preventing passage of lubricant between shaft 25 and thrust devices 33, 33a.

In FIG. 8, another ridge 133 of ridge plurality 123 is illustrated as being integrally formed from peripheral surface 27 of shaft 25 on a side of abutment ridge 129 opposite that of the other ridges 125 of the ridge plurality. The formation and location of ridge 133 permits a greater amount of metal in shaft 25 to be moved or otherwise rearranged therein into abutment ridge 129 if desired.

Figure 9:
FIG. 9 is a greatly enlarged sectional view taken from FIG. 6 and illustrating a ridge of a plurality thereof formed on the rotatable assembly of FIG. 6.

With further reference to FIG. 6 and also FIG. 9, another plurality of ridges 135 may, if desired, be grouped in a span 137 along shaft 25 between ridge pluralities 123, 123a, and it may be noted that portions 139, 139a of peripheral surface 27 of the shaft are not deformed between ridge plurality 135 and ridge pluralities 123, 123a, respectively. In ridge plurality 135, some of the ridges thereof, such as those indicated at 141, are deformed from peripheral surface 27 of shaft 25 in the same manner as previously discussed, and these ridges 141 are also generally annular being axially spaced from each other generally along the shaft so as to extend in part generally radially outwardly or beyond the peripheral surface of the shaft. It may be noted that ridges 141 each have an outer periphery or peripheral portion 143 extending or disposed radially outwardly or beyond peripheral surface 27 of shaft 25 generally at least as far as outer peripheries 127, 127a of abutment ridges 129, 129a of ridge pluralities 123, 123a. Thus, when heated as discussed hereinabove, bore 37 of rotor 35 will pass over outer peripheries 127, 127a of abutment ridges 129, 129a so that rotor 35 may be predeterminately located or disposed about ridge plurality 135 with respect to opposite end portions 45, 45a of shaft 25. Thereafter, upon cooling, rotor bore 37 is heat shrunk into gripping or displacement preventing engagement with outer peripheries 143 of at least some of ridges 141 in ridge plurality 135 across span 137 thereof. It is contemplated that ridges 129, 129a may be omitted from ridge pluralities 123, 123a with thrust devices being respectively located thereon in the same manner as previously discussed with respect to ridge plurality 29 within the scope of the invention in one form thereof so as to meet at least some of the objects of such invention.

Figure 10:
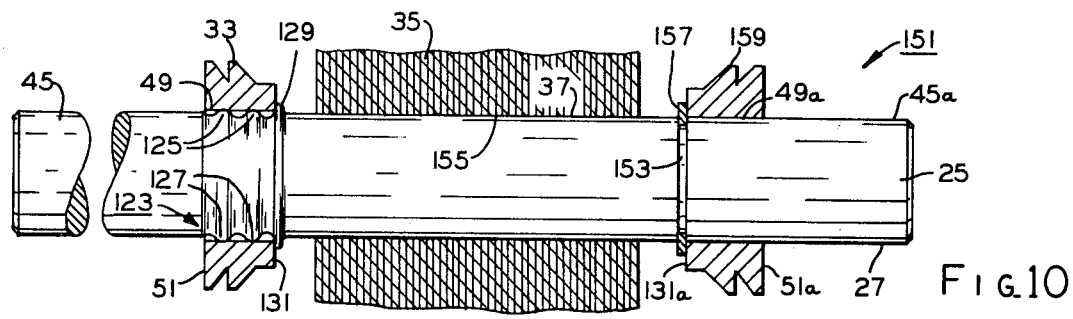
FIG. 10 is a partial sectional view of another alternative rotatable assembly.

There is illustrated in FIG. 10 another or an alternative rotatable assembly 151 adapted for use in prime mover 23 having generally the same component parts and functioning generally in the same manner as the previously discussed rotatable assembly 21 with the exceptions discussed hereinafter.

In rotatable assembly 151, peripheral surface 27 of shaft 25 is deformed so as to locate ridge plurality 123 thereon with respect to opposite end portion 45 of the shaft, and an annular groove 153 or the like is provided in the shaft in axial spaced relation with respect to at least one of abutment ridge 129 of the ridge plurality and opposite end portion 45a of the shaft. A span 155 of peripheral surface 27 on shaft 25 between ridge plurality 123 and groove 153 is not deformed so as to include any ridges. Thus, when heated as discussed above, bore 37 of rotor 35 may be passed or otherwise moved over opposite end portions 45, 45a of shaft 25 to its preselected location on span 155 with respect to the opposite end portions, and upon cooling, the bore is heat shrunk about the shaft in gripping, press-fitted or displacement preventing engagement therewith. Thereafter, a generally annular seating member, such as a split ring retainer 157 or the like, may be positioned in groove 153 in order to seat another thrust device 159 which may be of a construction and/or material different than that of thrust devices 33, 33a, if desired. Of course, thrust device 33 may be associated with ridge plurality 123 and abutment ridge 129 thereof in the same manner as discussed hereinbefore so as to be disposed about shaft 25 in gripping or displacement preventing engagement therewith either before or after the disposition of rotor 35 and thrust device 159 on the shaft, as discussed above. Thus, it may be noted that thrust device 33 is predeterminately located in engagement with abutment ridge 129 of ridge plurality 123 with respect to opposite end 45 of shaft 25 and thrust device 159 is predeterminately located in abutment with retainer 157 with respect to opposite end portion 45a of the shaft. In this manner, thrust devices 33, 159 are located in abutment with abutment ridge 129 and retainer 157 in predetermined spaced apart relation and adapted for thrust engagement with thrust taking surfaces 63, 63a of stationary assembly 61, respectively, when rotatable assembly 151 is associated therewith in prime mover 23 in the same manner as previously discussed with respect to rotatable assembly 21.

Figure 11:
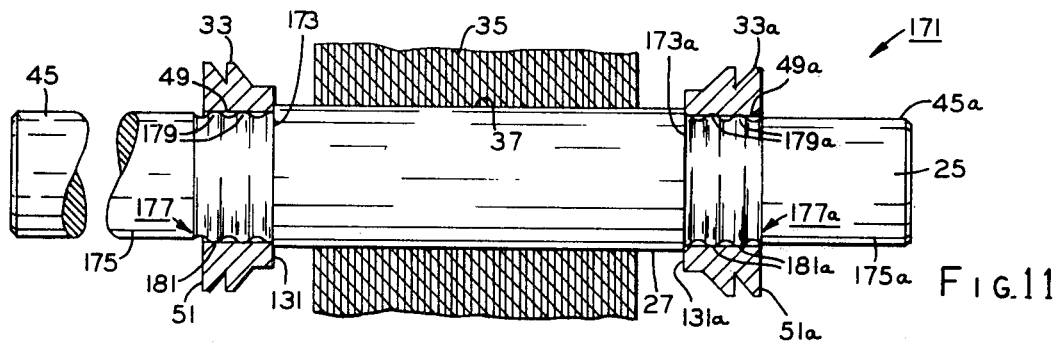
FIGS. 11 and 12 are partial sectional views showing an alternative rotatable assembly, respectively.

With reference to FIG. 11, another or an alternative rotatable assembly 171 is provided for use in prime mover 23 with the rotatable assembly having generally the same component parts and functioning generally in the same manner in the prime mover as the above discussed rotatable assembly 21 with the exceptions set out hereinafter.

In rotatable assembly 171, shaft 25 is stepped so as to provide a pair of generally annular opposite shoulders at 173, 173a about the shaft. Thus, peripheral surface 27 of shaft 25 between opposite shoulders 173, 173a has a greater circumference than a pair of reduced sections or portions 175, 175a of the shaft between the opposite shoulders and opposite end portions 45, 45a of the shaft. A pair of plurality of ridges 177, 177a are integrally formed from the peripheral surfaces of reduced sections 175, 175a of shaft 25 so as to be disposed thereabout generally adjacent shoulders 173, 173a. It may be noted that, if desired, ridges 179, 179a of ridge pluralities 177, 177a may have generally the same shapes or configurations as disclosed hereinbefore with respect to ridges 31 of ridge plurality 29 (as best seen in FIG. 4), and ridges 179, 179a may be formed on reduced sections 175, 175a generally in the same manner as previously discussed above with respect to ridges 31 of ridge plurality 29. Thus, each of ridges 179, 179a are predeterminately shaped so as to be generally annular about shaft 25 and axially spaced apart from each other along the shaft, and the ridges extend in part radially outwardly or beyond reduced sections 175, 175a of the shaft. Further, ridges 179, 179a are each provided with an outer periphery or peripheral portion 181, 181a predeterminately spaced generally radially outwardly or beyond reduced section 175, 175a of shaft 25; however, it may be noted that such outer periphery of the ridges have a circumference which is less than that of peripheral surface 27 of the shaft and greater than that of the reduced sections of the shaft. In assembling thrust devices 33, 33a onto reduced sections 175, 175a of shaft 25, openings 49, 49a of the thrust devices are passed over opposite ends 45, 45a of the shaft and moved along the reduced portions thereof toward ridge pluralities 177, 177a, respectively. Thereafter, opening 49, 49a of thrust devices 33, 33a may be pressed or otherwise moved into press fitting engagement with outer peripheries 181, 181a of ridges 179, 179a so that the thrust devices are disposed about reduced sections 175, 175a of shaft 25 in gripping or displacement preventing engagements of with at least some of the ridges of ridge pluralities 177, 177a. Thus, the engagements between thrust device openings 49, 49a and peripheral portions 181, 181a or ridge pluralities 177, 177a define the aforementioned seal plurality between shaft 25 and thrust devices 33, 33a. Further, it may also be noted that upon the aforementioned disposition of thrust devices 33, 33a in the gripping engagement about ridges 179, 179a, sidewalls 131, 131a of the thrust devices may be moved into locating or abutting engagement with shoulders 173, 173a. Since shoulders 173, 173a are predeterminately located axially of shaft 25 with respect to shaft opposite end portions 45, 45a or such other shaft features as may be provided for such location, opposite thrust bearings 51, 51a of thrust devices 33, 33a are also predeterminately located in axially spaced apart relation with respect to each other and with respect to the shaft opposite end portions. Thus, thrust bearings 51, 51a are predeterminately arranged for thrust engagement with thrust taking surfaces 63, 63a of stationary assembly 61 when rotatable assembly 171 is associated or assembled therewith in prime mover 23 in the same manner as previously discussed with respect to rotatable assembly 21.

Figure 12:
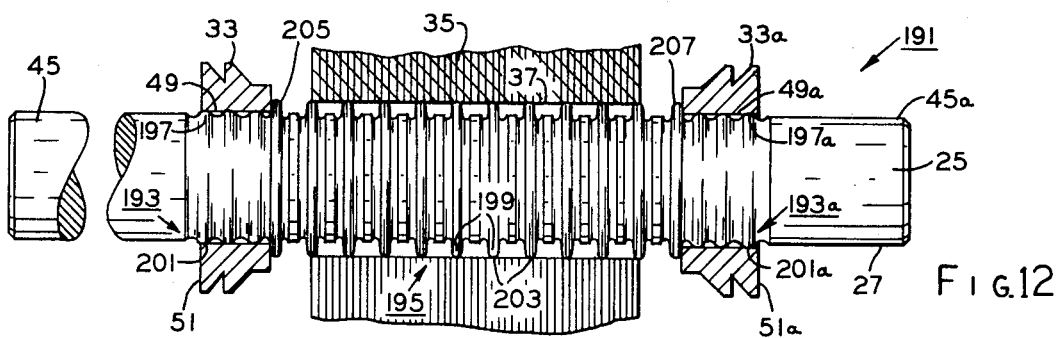

In FIG. 12, there is shown another or alternative rotatable assembly 191 for use in prime mover 23 with rotatable assembly 191 having generally the same component parts and functioning in the prime mover generally in the same manner as previously discussed rotatable assembly 21.

With respect to rotatable assembly 191, a pair of generally opposite pluralities of ridges 193, 193a are grouped in predetermined axially spaced apart locations or positions on shaft 25 which are conveniently and accurately predetermined with respect to opposite ends 45, 45a of the shaft or such other shaft features as may be provided for such location, and another plurality of ridges 195 is grouped or span between ridge pluralities 193, 193a. These ridge pluralities 193, 193a, 195 may be formed, deformed or otherwise provided in peripheral surface 27 of shaft 25 in the same manner as previously described with respect to ridge plurality 29 (as best seen in FIG. 4 for instance). Each ridge 197, 197a of ridge pluralities 193, 193a and each ridge 199 of ridge plurality 195 are predeterminately shaped so as to be generally annular and axially spaced apart from each other along shaft 25 and to extend radially outwardly or beyond peripheral surface 27 of shaft 25, and ridges 197, 197a respectively have an outer periphery or peripheral portion 201 which extends or is disposed radially outwardly or beyond peripheral surface 27 of shaft 25. It may be noted that ridges 199 of ridge plurality 195 also have an outer periphery or peripheral portion 203 which extends radially outwardly or beyond peripheral surface 27 of shaft 25 a predetermined distance farther than outer peripheries 201 of ridges 197, 197a. Further, it may also be noted that the axially outermost ones of ridges 199, such as ridge pair 205, 207, are arranged immediately adjacent ridge pluralities 193, 193a and are predeterminately located axially on the shaft with respect to shaft opposite end portions 45, 45a or such other shaft features as may be provided for such location so as to define means or abutment ridges for seating or locating engagement with thrust devices 33, 33a, as discussed hereinafter.

In assembling rotatable assembly 191, bore 37 of rotor 35 may be heat shrunk into gripping or displacement preventing engagement about outer peripheries 203 of at least some of ridges 199 of ridge plurality 195 in the same manner as previously discussed. Openings 49, 49a of thrust devices 33, 33a are passed over opposite end portions 45, 45a of shaft 25 so as to be press-fitted in gripping or displacement preventing engagement about outer peripheries 201 of ridges 197, 197a in ridge pluralities 193, 193a so that such engagements define the aforementioned generally annular seal plurality between the ridges and the thrust devices. Further, when thrust devices 33, 33a are so disposed in the press-fitting engagement about ridges 197, 197a of ridge pluralities 193, 193a, it may be noted that sidewalls 133, 133a of the thrust devices are predeterminately arranged or located in seating or abutting engagement with ridge pairs 205, 207 of ridge plurality 195. Therefore, since ridge pairs 205, 207 are predeterminately located axially of shaft 25 with respect to opposite ends 45, 45a thereof, opposite thrust bearings 51, 51a of thrust devices 33, 33a are also predeterminately axially spaced apart or located with respect to each other when the thrust devices are seated against ridge pairs 205, 207. Thus, thrust bearings 51, 51a are predeterminately arranged for thrust engagement with thrust-taking surfaces 63, 63a of stationary assembly 61 when rotatable assembly 191 is associated or assembled therewith in prime mover 23 in the same manner as previously described with respect to rotatable assembly 21.

From the foregoing, it is now apparent that a novel method of manufacturing a prime mover and a novel method of manufacturing a rotatable assembly have been provided meeting the objects set out herein as well as others, and it is contemplated that changes may be made as to the precise configurations, shapes, details and connections of the component parts of the prime mover and rotatable assembly and also as to the precise steps of the methods by those having ordinary skill in the art without departing from the spirit of the invention or the scope of the invention which is set out by the claims which follow.

What I claim as new and desire to secure by Letters Patent of the United States is:

1. A method of manufacturing a rotatable assembly adapted for use in a prime mover, the rotatable assembly including a shaft having a pair of opposite end portions and a peripheral surface between the opposite end portions, the method comprising the steps of:
    (a) deforming from the shaft a plurality of generally annular axially spaced apart ridges and extending at least one of the ridges of the plurality thereof in part generally radially beyond the peripheral surface of the shaft further than the other ridges of the plurality thereof; and
    (b) passing a generally annular thrust device over one of the opposite ends of the shaft into gripping engagement about at least some of the other ridges and abutting a confronting portion on the thrust device with the at least one ridge.

2. The method as set forth in claim 1 wherein the deforming and extending step comprises locating the at least one ridge predeterminately on the shaft with respect to the one opposite end thereof.

3. A method of making a rotatable assembly for use in a prime mover with the rotatable assembly having a shaft with a peripheral surface, the method comprising: deforming from the peripheral surface of the shaft three groupings of pluralities of generally annular axially spaced ridges and extending the ridges of the plurality thereof in each of the groupings at least in part radially beyond the peripheral surface with at least some of the ridges in one of the groupings extending radially beyond the peripheral surface farther than the ridges in the other two groupings.

4. The method as set forth in claim 3 comprising the additional step of disposing a generally annular rotor in a preselected position about the shaft in gripping engagement with the at least some ridges in the one grouping.

5. The method as set forth in claim 4 wherein the disposing step includes heat shrinking the rotor into the gripping engagement with the at least some ridges in the one grouping.

6. The method as set forth in claim 3 comprising the additional step of disposing a pair of generally annular thrust devices about the shaft in gripping engagement with at least some of the ridges in the other two groupings, respectively.

7. The method as set forth in claim 3 comprising the additional step of pressing a pair of generally annular thrust devices over at least some of the ridges in the other two groupings into gripping engagement therewith.

8. A method of manufacturing a rotatable assembly for use in a prime mover, the rotatable assembly including a shaft having a pair of opposite end portions and a peripheral surface therebetween, and at least one thrust device, the method comprising the steps of:

deforming from the shaft a plurality of generally annular axially spaced apart ridges and extending the ridges in part generally radially beyond the peripheral surface of the shaft with at least one of the ridges being positioned in predetermined spaced relation with respect to one of the end portions of the shaft; and moving at least one of the shaft and the at least one thrust device generally axially so as to dispose the at least one thrust device about the shaft in displacement preventing engagement with at least some of the ridges and engaging a part of the at least one thrust device with the at least one ridge to effect the location of the at least one thrust device on the shaft with respect to the one end portion thereof.

9. A method of manufacturing a prime mover having a stationary assembly with a pair of opposed thrust surfaces predeterminately axially spaced apart thereon, a rotatable assembly including a shaft with a pair of opposite end portions, a peripheral surface on the shaft between the opposite end portions, and a pair of generally annular thrust devices, the method comprising the steps of:

deforming from the shaft a plurality of generally annular axially spaced apart ridges with the ridges extending in part generally radially beyond the peripheral surface of the shaft and providing a pair of the ridges with a generally radial extent greater than at least some of the other of the ridges and with the ridge pair being located in predetermined axial relation on the shaft with respect to the opposite ends thereof;

passing the thrust device pair onto the opposite end portions of the shaft into gripping engagement with some of the at least some other ridges and locating the thrust device pair in spaced axial relation on the shaft in engagement with the ridge pair, respectively; and assembling the opposite end portions of the shaft in rotatable engagement with the stationary assembly and arranging the thrust device pair with respect to the thrust surface pair for engagement therewith to predeterminately limit end play movement of the rotatable assembly with respect to the stationary assembly.

10. A method of manufacturing a rotatable assembly adapted for use in a dynamoelectric machine, the rotatable assembly including a shaft having a peripheral surface along at least a part thereof, and at least another component having an opening therein, the method comprising the steps of:

forming from the shaft a plurality of generally annular axially spaced apart ridges with the ridges having generally annular peripheral portions disposed generally radially outwardly beyond the peripheral surface of the shaft and extending the annular peripheral portion of at least one of the ridges farther generally radially outwardly beyond the peripheral surface of the shaft than the annular peripheral portions of at least some of the other ridges; and associating the opening in the at least another component generally about at least some of the at least some other ridges in displacement preventing engagement with the annular peripheral portions thereof and abutting a portion of the at least another component with a part of the at least one ridge disposed between the annular peripheral portion thereof and the annular peripheral portion of the at least some of the at least some other ridges.

11. A method of manufacturing a rotatable assembly adapted for use in a dynamoelectric machine, the rotatable assembly including a shaft having a peripheral surface along at least a part thereof, and at least three other components having an opening therein, respectively, the method comprising the steps of:

forming from the shaft a plurality of generally annular axially spaced apart ridges arranged in a plurality of groupings thereof along the shaft with the ridges having generally annular peripheral portions disposed generally radially outwardly beyond the peripheral surface of the shaft and extending the annular peripheral portions of at least some of the ridges in one of the ridge groupings farther generally radially outwardly beyond the peripheral surface of the shaft than the annular portions of the ridges in the other of the ridge groupings with a pair of axially outermost ridges of the at least some ridges in the one ridge grouping being respectively located in a predetermined position along the shaft;

positioning the opening in one of the at least three other components in displacement preventing engagement with the annular peripheral portions of at least some of the at least some ridges in the one ridge grouping and arranging the openings in two of the at least three other components in displacement preventing engagement with the annular peripheral portions of at least some of the ridges in two other of the ridge groupings and in locating engagement with the axially outermost ridge pair in the one ridge grouping, respectively.

12. A method of manufacturing a rotatable assembly adapted for use in a dynamoelectric machine, the rotatable assembly including a shaft having a peripheral surface, and at least a pair of other components having an opening therein, respectively, the method comprising the steps of:

forming from the shaft a plurality of generally annular axially spaced apart ridges arranged in a plurality of groupings thereof along the shaft and with the ridges having generally annular peripheral portions disposed generally radially outwardly beyond the peripheral surface of the shaft and locating at least one of the ridges in one of the ridge groupings in a predetermined position on the shaft with the annular peripheral portion of the at least one ridge in the one ridge grouping extending farther generally radially outwardly beyond the peripheral surface of the shaft than the annular peripheral portions of the other of the ridges in the one ridge grouping; and arranging the openings in the other component pair of the rotatable assembly in displacement preventing engagement with the peripheral portions of at least some of the ridges in the one ridge grouping and at least some of the ridges in another of the ridge groupings, respectively, and abutting a part of one of the other components of the pair thereof with the at least one ridge of the one ridge grouping.

13. A method of manufacturing a rotatable assembly adapted for use in a dynamoelectric machine, the rotatable assembly including a shaft having a peripheral surface, and at least a pair of other components having an opening therein, respectively, the method comprising the steps of:

forming from the shaft a plurality of generally annular axially spaced apart ridges having generally annular peripheral portions disposed generally radially outwardly beyond the peripheral surface of the shaft and locating at least one of the ridges in one of the ridge groupings in a predetermined position on the shaft with the annular peripheral portion of the at least one ridge in the one ridge grouping extending farther generally radially outwardly beyond the peripheral surface of the shaft than the annular peripheral portions of the other ridges in the one ridge grouping and with the annular peripheral portions of at least some of the ridges in another of the ridge groupings extending generally radially outwardly beyond the peripheral surface of the shaft at least as far as the annular peripheral portion of the at least one ridge of the one ridge grouping; and arranging the openings in the other component pair of the rotatable assembly in displacement preventing engagement with the peripheral portions of at least some of the ridges in the one ridge grouping and the another ridge grouping, respectively, and abutting a part of one of the other component of the pair thereof with the at least one ridge of the one ridge grouping.

14. A method of manufacturing a rotatable assembly adapted for use in a prime mover, the rotatable assembly including a metallic shaft having a pair of opposite end portions with a peripheral surface therebetween, and at least one generally annular thrust device having an opening therein, the method comprising the steps of:

deforming a plurality of generally annular axially spaced apart ridges from the shaft generally without removing metal therefrom with the ridges respectively having a generally annular peripheral portion and extending the respective annular peripheral portions of the ridges generally radially outwardly beyond the peripheral surface of the shaft; and moving at least one of the shaft and the at least one thrust device generally axially so as to engage the opening in the at least one thrust device in displacement preventing engagement with the peripheral portions of at least some of the ridges and to effect a predetermined radially spaced apart relation between the opening and the peripheral surface of the shaft and engaging another part of the at least one thrust device with another one of the ridges to effect a predetermined axial spaced apart relation between the another part of the at least one thrust device and at least one of the opposite end portions of the shaft.

15. The method as set forth in claim 14 wherein the rotatable assembly further includes a rotor having another opening therein and comprising the intermediate step of positioning the another opening in the rotor about the shaft in displacement preventing engagement with the peripheral portions of at least some of the other of the ridges and effecting a predetermined radially spaced apart relation between the another opening and the peripheral surface of the shaft as well as a predetermined axial spaced apart relation between another part of the rotor and at least one of the at least one opposite end portion and the other of the opposite end portions of the shaft.

16. The method as set forth in claim 14 wherein the deforming and extending step comprises spacing the peripheral portion of the another one ridge further radially outwardly from the peripheral surface of the shaft than the peripheral portions of the at least some ridges.

17. The method as set forth in claim 14 wherein the deforming and extending step comprises positioning the another one ridge in predetermined axial spaced relation with the at least one opposite end portion of the shaft.

18. A method of manufacturing a prime mover having a stationary assembly with a pair of opposed thrust surfaces predeterminately axially spaced apart thereon, a rotatable assembly including a shaft with a pair of opposite end portions, a peripheral surface on the shaft between the opposite end portions, and a pair of generally annular thrust devices, the method comprising the steps of:

deforming from the shaft a plurality of generally annular axially spaced apart ridges with the ridges respectively having peripheral portions extending generally radially beyond the peripheral surface of the shaft and providing the peripheral portions of at least a pair of the ridges with a radial extent greater than that of at least some of the other ridges with the ridge pair being located in predetermined axial relation with respect to at least one of the opposite end portions of the shaft, respectively;

passing the thrust device pair over the opposite end portions of the shaft into displacement preventing engagement with the peripheral portions of at least some of the at least some other ridges and into locating engagement with the ridge pair, thereby locating the thrust device pair both in predetermined radially spaced relation with respect to the peripheral surface of the shaft and in predetermined axial spaced relation with respect to one of the at least one opposite end portion and the other of the opposite end portions of the shaft, respectively; and assembling the opposite end portions of the shaft in rotatable engagement with the stationary assembly and arranging the thrust device pair with respect to the opposed thrust surface to predeterminately limit end play movement of the rotatable assembly with respect to the stationary assembly.

19. A method of manufacturing a rotatable assembly adapted for use in a dynamoelectric machine, the rotatable assembly including a metallic shaft having a peripheral surface between a pair of opposite ends thereof, and at least another component having an opening therein, the method comprising the steps of:

forming from the shaft a plurality of generally annular and axially spaced apart ridges generally without removing metal from the shaft during the formation of the ridges and with the ridges having generally annular peripheral portions disposed generally radially outwardly beyond the peripheral surface of the shaft and extending the annular peripheral portion of at least one of the ridges farther generally radially outwardly beyond the peripheral surface of the shaft than the annular peripheral portions of at least some of the other ridges; and positioning the opening in the at least another component in predetermined radially spaced relation with respect to the peripheral surface of the shaft by gripping the opening in the at least another component in displacement preventing engagement with the annular peripheral portions of at least some of the at least some other ridges and abutting a portion of the at least another component with a part of the at least one ridge generally disposed between the annular peripheral portion thereof and the annular peripheral portions of the at least some other ridges thereby to locate the at least another component in predetermined axially spaced relation with respect to at least one of the opposite ends of the shaft generally as the opening in the at least another component is gripped into the displacement preventing engagement with the annular peripheral portions of the at least some of the at least some other ridges.

20. A method of manufacturing a rotatable assembly adapted for use in a dynamoelectric machine, the rotatable assembly including a metallic shaft having a peripheral surface, and at least a pair of components having an opening therein, respectively, the method comprising the steps of:

forming from the shaft a plurality of generally annular axially spaced apart ridges generally without removing metal from the shaft during the formation of the ridges with the ridges having generally annular peripheral portions disposed generally radially outwardly of the peripheral surface of the shaft and arranging the ridges in a plurality of groupings thereof along the shaft with the annular peripheral portions of at least some of the ridges in one of the groupings extending farther generally radially outwardly beyond the peripheral surface of the shaft than the annular peripheral portions of the ridges in another pair of the groupings thereof and with the axially outermost ridges of the at least some ridges in the one ridge grouping being respectively located in a predetermined position along the shaft; and positioning the openings in the component pair in predetermined spaced relation with respect to the peripheral surface of the shaft by gripping the openings in the component pair in displacement preventing engagement with the annular peripheral portions of at least some of the ridges in the another grouping pair, respectively, and abutting a part of at least one of the components in abutment with one of the outermost ridges of the at least some ridges in the one ridge grouping generally when the opening in the at least one component is in the displacement preventing engagement with the annular peripheral portions of the at least some ridges in one of the groupings of the another grouping pair so as to predeterminately locate the at least one component on the shaft.

21. A method of manufacturing a rotatable assembly adapted for use in a dynamoelectric machine, the rotatable assembly including a metallic shaft having a peripheral surface, and at least another component having an opening therein, the method comprising the steps of:

forming from the shaft a plurality of generally annular axially spaced apart ridges generally without removing metal from the shaft during the formation of the ridges with the ridges having generally annular peripheral portions disposed generally radially outwardly beyond the peripheral surface of the shaft and arranging the ridges in a plurality of groupings thereof along the shaft with at least one ridge in one of the groupings being located in a predetermined position on the shaft and having its annular peripheral portion extending radially outwardly beyond the peripheral surface of the shaft farther than the annular peripheral portions of the other of the ridges in the one grouping and at least as far as at least some of the ridges in another of the groupings; and positioning the opening in the another component in predetermined radially spaced relation with respect to the peripheral surface of the shaft by gripping the opening in the at least another component in displacement preventing engagement with the annular peripheral portions of at least some of the other ridges in the one grouping and abutting a part of the another component with the at least one ridge in the one grouping generally when the opening in the at least another component is gripped in the displacement preventing engagement with the annular peripheral portions of the at least some other ridges in the one grouping.

22. A method of manufacturing a prime mover having a stationary assembly and a rotatable assembly for association in magnetic coupling relation, the stationary assembly including a bearing housing with a thrust surface thereon, a window in the bearing housing and intersecting with the thrust surface, and a lubrication system extending generally about the bearing housing with lubricant wicking means disposed in the window, the rotatable assembly including a shaft having at least one end portion, a peripheral surface on the shaft, and at least one generally annular thrust device, the method comprising the steps of:

(a) engaging the thrust device about a plurality of generally annular axially spaced apart ridges on the shaft so that the engagement of the thrust device and the ridges define a seal therebetween;

(b) assembling the at least one end portion of the shaft so as to be rotatably supported in the bearing hub and in lubrication relation with the lubricant wicking means in the window of the bearing housing; and (c) arranging the thrust device generally axially with respect to the thrust surface and wicking means for thrust-taking relation and lubrication relation therewith, respectively, and also generally radially within the extent of the lubrication system about the bearing housing.

* * * * *